United States Patent
Homrich

(10) Patent No.: US 9,446,462 B2
(45) Date of Patent: Sep. 20, 2016

(54) MATERIAL CUTTER CLAMPING COLLET

(75) Inventor: Paul Robert Homrich, Maybee, MI (US)

(73) Assignee: BRASSCRAFT MANUFACTURING COMPANY, Novi, MI (US)

( * ) Notice: Subject to any disclaimer, the term of this patent is extended or adjusted under 35 U.S.C. 154(b) by 2661 days.

(21) Appl. No.: 12/045,105

(22) Filed: Mar. 10, 2008

(65) Prior Publication Data

US 2009/0224490 A1  Sep. 10, 2009

(51) Int. Cl.
*B23D 33/02* (2006.01)
*B26D 7/01* (2006.01)
*B26D 7/02* (2006.01)
*B23D 21/00* (2006.01)
*B23B 31/20* (2006.01)

(52) U.S. Cl.
CPC ............. *B23D 21/00* (2013.01); *B26D 7/02* (2013.01); *B23B 31/20* (2013.01); *B23D 33/02* (2013.01); *B26D 7/01* (2013.01); *B26D 2007/013* (2013.01); *Y10T 279/17119* (2015.01); *Y10T 279/17341* (2015.01); *Y10T 279/17427* (2015.01); *Y10T 279/17461* (2015.01); *Y10T 279/17521* (2015.01); *Y10T 407/2276* (2015.01)

(58) Field of Classification Search
CPC ...... B23B 31/20; B23D 21/00; B23D 33/02; B26D 7/01; B26D 7/02; B26D 2007/013; Y10T 279/17119; Y10T 279/17341; Y10T 279/17461; Y10T 279/17427; Y10T 279/17521; Y10T 407/2276
USPC ....... 279/43.4, 50, 46.7, 20.1, 46.3; 407/104
IPC ....................................................... B23B 31/20
See application file for complete search history.

(56) References Cited

U.S. PATENT DOCUMENTS

| | | | | |
|---|---|---|---|---|
| 1,946,629 A | * | 2/1934 | Laughlin | 279/51 |
| 2,018,452 A | * | 10/1935 | Laughlin | 279/51 |
| 2,155,019 A | * | 4/1939 | Martin | 279/46.6 |
| 2,219,008 A | * | 10/1940 | Driasner | 279/46.6 |
| 2,228,337 A | * | 1/1941 | Balas | 279/46.6 |
| 2,291,398 A | * | 7/1942 | Martin | 279/51 |
| 2,374,192 A | * | 4/1945 | Godfrey | 279/51 |

(Continued)

OTHER PUBLICATIONS http://www.merriam-webster.com/dictionary/coupled; coupled definition; p. 1.*

(Continued)

*Primary Examiner* — David Bryant
*Assistant Examiner* — Bayan Salone
(74) *Attorney, Agent, or Firm* — Carlson, Gaskey & Olds

(57) ABSTRACT

A clamping assembly is disclosed that includes a tapered collar extending radially inward towards an axis. A clamping sleeve is movable along the axis relative to the tapered collar. The clamping sleeve includes flexible arms. An actuator is coupled to the clamping sleeve and is configured to move the clamping sleeve along the axis between extended and retracted positions. A collet is supported relative to the sleeve. The collet includes a body having an axially extending opening configured to receive the material and circumferential fingers arranged about the opening. The clamping sleeve forces the fingers radially inward with the clamping sleeve in the extended position to clamp and hold the material. The biasing member urges the fingers radially outward with the clamping sleeve in the retracted position. Replaceable inserts can also be secured to each finger facing the opening.

16 Claims, 3 Drawing Sheets

(56) References Cited

U.S. PATENT DOCUMENTS

| | | | | |
|---|---|---|---|---|
| 2,383,508 | A * | 8/1945 | Martin | 279/51 |
| 2,534,616 | A * | 12/1950 | Milligan | 279/51 |
| 2,563,464 | A * | 8/1951 | Green | 279/20.1 |
| 2,574,157 | A * | 11/1951 | Reichert | 279/66 |
| 2,680,623 | A * | 6/1954 | Hasselblad et al. | 279/20.1 |
| 2,817,534 | A * | 12/1957 | Cox | 279/50 |
| 3,121,572 | A * | 2/1964 | Torok | 279/50 |
| 3,147,018 | A * | 9/1964 | Reichert | 279/35 |
| 3,342,107 | A * | 9/1967 | Margolien | 409/205 |
| 3,686,990 | A * | 8/1972 | Margolien | 83/409 |
| 3,874,688 | A * | 4/1975 | Schiller | 279/50 |
| 4,309,041 | A * | 1/1982 | Peterson et al. | 279/46.7 |
| 4,336,947 | A * | 6/1982 | Franklin | 279/20.1 |
| RE31,016 | E * | 8/1982 | Oster | 166/241.3 |
| 4,484,718 | A * | 11/1984 | Jones-Fenleigh | 242/405.3 |
| 4,712,954 | A * | 12/1987 | Campolito | 409/163 |
| 4,867,463 | A * | 9/1989 | Hopf | 279/46.7 |
| 4,948,105 | A * | 8/1990 | Yonezawa | 269/32 |
| 5,405,220 | A * | 4/1995 | Ishikawa | 408/56 |
| 5,584,513 | A * | 12/1996 | Sweeny et al. | 285/323 |
| 5,947,484 | A * | 9/1999 | Huggins et al. | 279/43.4 |
| 5,951,024 | A * | 9/1999 | Montjoy et al. | 279/43 |
| 5,979,267 | A * | 11/1999 | Yonezawa | 74/531 |
| 5,997,010 | A * | 12/1999 | Lloyd | 279/2.03 |
| 6,014,919 | A * | 1/2000 | Jacobsen et al. | 83/282 |
| 6,179,697 | B1 * | 1/2001 | Shibai | 451/359 |
| 6,260,458 | B1 * | 7/2001 | Jacobsen et al. | 83/227 |
| 6,485,235 | B1 * | 11/2002 | Mast et al. | 408/1 R |
| 6,533,290 | B2 * | 3/2003 | Marchand | 279/20.1 |
| 6,553,880 | B2 * | 4/2003 | Jacobsen et al. | 83/75 |
| 6,554,265 | B2 * | 4/2003 | Andronica | 269/268 |
| 6,640,679 | B1 * | 11/2003 | Roberts, Jr. | 82/165 |
| 6,726,223 | B2 * | 4/2004 | Haimer | 279/103 |
| 6,766,720 | B1 * | 7/2004 | Jacobsen et al. | 83/75 |
| 7,036,409 | B2 * | 5/2006 | Dunner | 82/162 |
| 7,258,348 | B2 * | 8/2007 | Carrier | 279/4.07 |
| 8,210,546 | B2 * | 7/2012 | Kohler | 279/23.1 |

OTHER PUBLICATIONS

Merriam Webster, http://www.merriam-webster.com/dictionary/taper; p. 1.*

Merriam Webster; http://www.merriam-webster.com/dictionary/slot; p. 1.*

* cited by examiner

MATERIAL CUTTER CLAMPING COLLET

BACKGROUND

This disclosure relates to a clamping assembly used with a material feeder. More particularly, the disclosure relates to a collet used in the clamping assembly.

A manufacturing operation includes a material feeder that provides material, such as tubing, to a cutter assembly, which cuts the material to a desired length. The cutter assembly includes a clamping assembly that clamps the material while it is cut to length.

In one example arrangement, the clamping assembly includes a plastic collet having multiple circumferentially arranged fingers. The structure of the collet is rather complex, requiring significant machining. A clamping sleeve cooperates with the collet when in an extended position to force the fingers radially inward to clamp the material. After the material is cut, the clamping sleeve is retracted to release the fingers from clamping engagement with the material. However, the fingers typically do not fully retract. This results in the fingers creating drag on the material, which wears the collet out after several days of operation. The manufacturing operation must be shut down each time the collet is replaced, thus increasing part cost and reducing production output.

What is needed is a more robust clamping assembly that is not as susceptible to wear.

SUMMARY

A clamping assembly for a cutter assembly is disclosed that includes a tapered collar extending radially inward towards an axis. A clamping sleeve is movable along the axis relative to the tapered collar. The clamping sleeve includes flexible arms. An actuator is coupled to the clamping sleeve and is configured to move the clamping sleeve along the axis between extended and retracted positions. A collet is supported relative to the sleeve. The collet includes a body having an axially extending opening configured to receive the material. In one example, a peripheral slot extends toward the opening to provide a pivot and circumferentially arranged slots extend axially from an end of the peripheral slot to provide circumferential fingers about the opening. The clamping sleeve forces the fingers radially inward with the clamping sleeve in the extended position to clamp and hold the material. A biasing member urges the fingers radially outward with the clamping sleeve in the retracted position.

Accordingly, the disclosed collet is forced out of engagement by the biasing member, thus decreasing drag and increasing collet replacement intervals. Replaceable inserts can also be secured to each finger facing the opening, which enables only the inserts to be replaced as they become worn instead of replacing the complex collet.

BRIEF DESCRIPTION OF THE DRAWINGS

The disclosure can be further understood by reference to the following detailed description when considered in connection with the accompanying drawings wherein.

DETAILED DESCRIPTION

Figure 1:
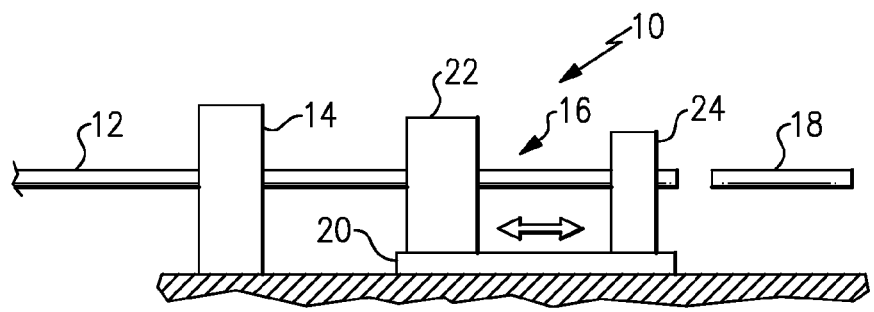
FIG. 1 is a schematic view of a material feeder and cutter assembly.

A material cutter 10 is schematically shown in FIG. 1. The material cutter 10 includes a feeder 14 that continuously feeds material 12, such as tubing. A cutter assembly 16 receives the material 12 and cuts it to a desired length 18. The cutter assembly 16 is mounted on a shuttle 20 that moves relative to the feeder 14 to enable continuous feeding of the material 12. The cutter assembly 16 includes a clamping assembly 22 and a cutter 24. The clamping assembly 22 holds the material 12 while the cutter 24 cuts the material 12 to a desired length 18.

Figure 3:
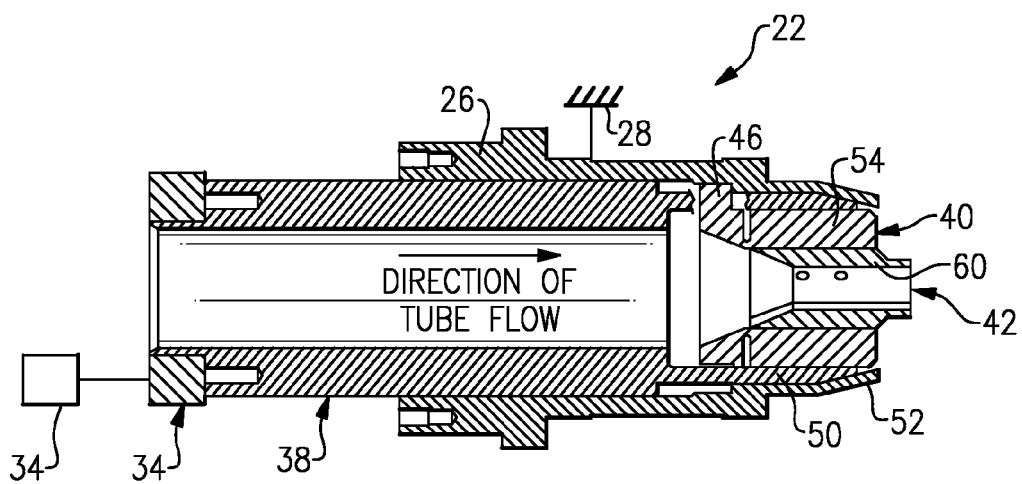
FIG. 3 is a cross-sectional view of a portion of the clamping assembly.
Figure 2:
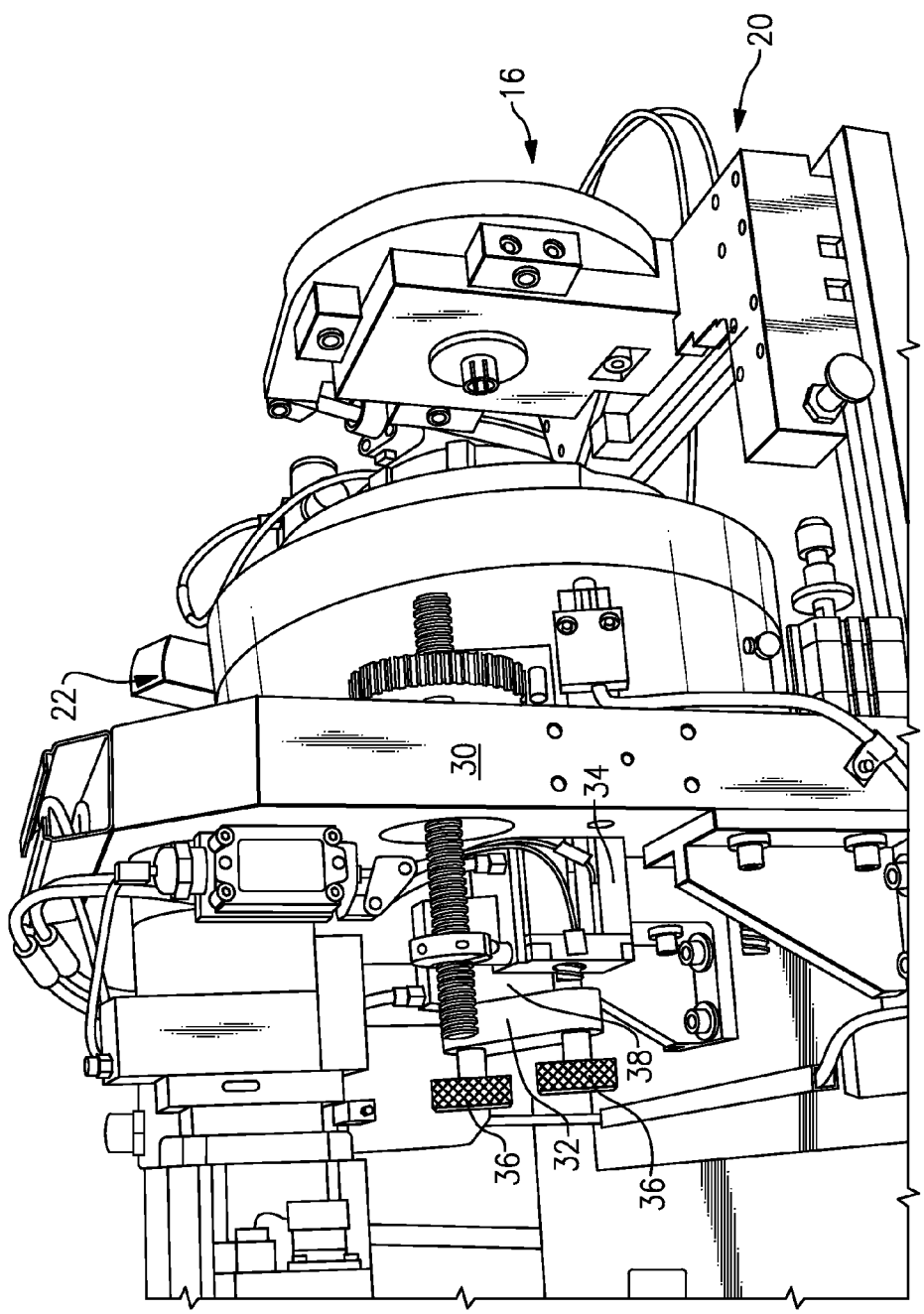
FIG. 2 is a perspective view of an example cutter assembly including a clamping assembly and a cutter.

Referring to FIGS. 2 and 3, the clamping assembly 22 includes a spindle 26 supported by a housing 28. The housing 28 is secured to the shuttle 20 by support 30. The spindle 26 includes a tapered collar 52, best shown in FIG. 3. A clamping sleeve 38 is slidably received within the spindle 26 and is movable along an axis A. The material 12 is fed into the clamping sleeve 38 along the axis A. Returning to FIG. 2, a bracket 32 is secured at one end of the clamping sleeve 38. Spaced apart actuators 34 (one shown) are mounted between the support 30 and the bracket 32. Adjustment knobs 36 enable adjustment of the clamp sleeve position relative to each actuator 34.

Figure 4:
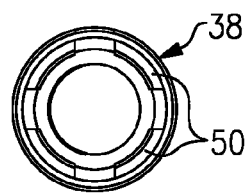
FIG. 4 is an end view of a clamping sleeve that cooperates with a collet to clamp material.

The clamping sleeve 38 includes circumferentially arranged axially extending arms 50 arranged near the tapered collar 52, best shown in FIGS. 2 and 4. The actuators 34 move the clamping sleeve 38 between a retracted position (shown in FIG. 3) and an extended position, which the arms 50 are forced radially inward by the tapered collar 52.

Figure 5:
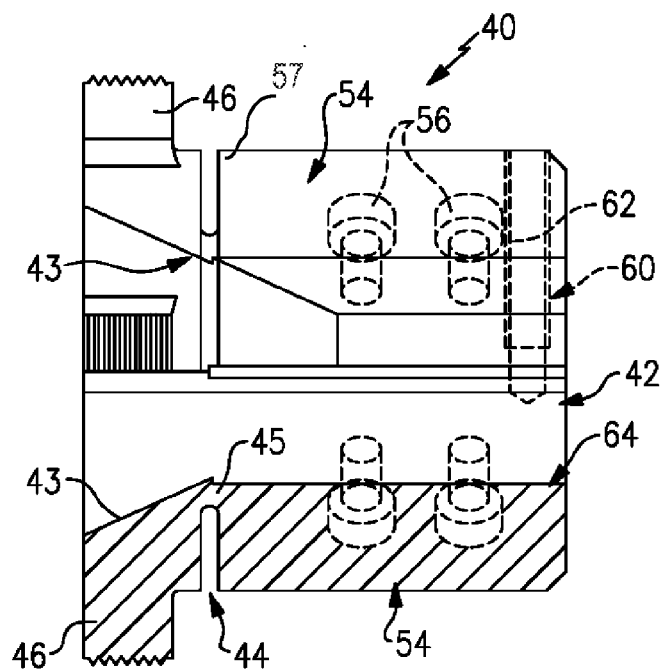
FIG. 5 is a partial cross-sectional view of the disclosed collet.

A collet 40 is secured relative to the spindle 26. In one example, the collet 40 includes threaded ears 46 that secure the collet 40 to the spindle 26. The threaded ears 46 are circumferentially spaced relative to one another, and the arms 50 of the clamping sleeve 38 are received between the threaded ears 46 in arcuate openings 48 (FIG. 5). The collet 40 includes circumferentially arranged axially extending fingers 54 that are forced radially inward by the arms 50 in the extended position to clamp the material 12. As described previously, the fingers 54 did not fully retract with the clamping sleeve 38 in the retracted position, which resulted in the collet 40 becoming worn and needing replacement from dragging on the material.

Figure 6:
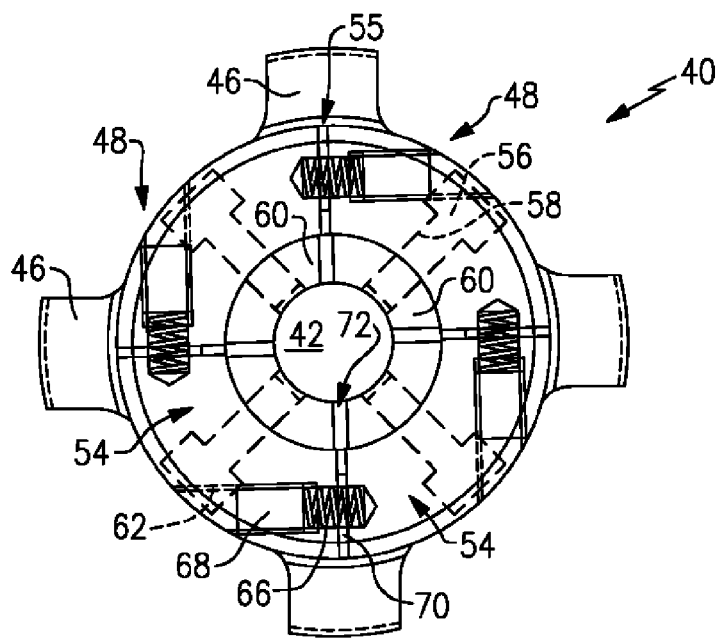
FIG. 6 is an end view of the collet shown in FIG. 5.

Referring to FIGS. 5 and 6, a collet 40 is disclosed that includes at least one biasing member to urge the fingers 54 radially outwardly to disengage the material 12. The collet 40 includes a body having a peripheral slot 44 that provides a pivot 45 for each of the fingers 54, as provided in the prior art collet. The slot 44 is circumferential (See FIG. 5) and extends radially inwardly at an axially innermost part 57 of the fingers 54 to allow the fingers to pivot radially inwardly and outwardly thereabout. The collet 40 includes a tapered surface 43 facilitating travel of the material 12 through the collet 40. Axial slots 55 extend from an end 64 to the peripheral slot 44, as previously provided. However, a biasing member, such as a spring 66, is provided between the fingers 54 to urge the fingers 54 radially outward and out of engagement with the material.

A hole 62 extends through adjacent fingers 54. A spring 66 is disposed in the hole, and a fastener 68, such as a set screw, is secured to the hole 62 to retain the spring 66 therein.

Adjacent faces 70 of adjoining fingers 54 are forced away from one another when the clamping sleeve 38 is moved from the extended position to the retracted position, which increases a size of a gap 72 between the faces 70.

An insert 60 is secured to an inner diameter at each of the fingers 54 to provide a replaceable wear surface so that the collet 40, with its complex structure, does not need to be replaced due to wear. The inserts 60 are secured to the fingers 54 by fasteners 58 secured within holes 56.

In one example, the collet 40 and inserts 60 are constructed from different materials, such as different plastics. The same materials can be used, if desired. For example, the collet 40 is constructed from a high viscosity acetal homopolymer, such as DELRIN, and the inserts are constructed from nylon having molybdenum disulfide, such as NYLATRON GS. Other suitable materials can be used for the collet 140 and/or inserts 60.

Although an example embodiment has been disclosed, a worker of ordinary skill in this art would recognize that certain modifications would come within the scope of the claims. For that reason, the following claims should be studied to determine their true scope and content.

What is claimed is:

1. A clamping assembly for a cutter assembly comprising:
a tapered collar extending radially inward towards an axis;
a clamping sleeve movable along the axis relative to the tapered collar, the clamping sleeve including flexible arms;
an actuator coupled to the clamping sleeve and configured to move the clamping sleeve along the axis between extended and retracted positions; and
a collet supported relative to the tapered collar, the collet including circumferentially arranged axially extending fingers, the clamping sleeve forcing the fingers radially inward in cooperation with said tapered collar with the clamping sleeve in the extended position, and a member biasing the fingers radially outward with the clamping sleeve in the retracted position.

2. The clamping assembly according to claim 1, wherein the collet includes an axially extending opening provided by the fingers and configured to receive material, a pivot comprising a peripheral slot from which said fingers move radially inwardly and outwardly, and circumferentially arranged slots extending axially from an end to the peripheral slot to provide the circumferentially arranged fingers, the fingers including faces adjacent to adjoining finger faces, and the member arranged between the fingers and configured to bias the fingers away from one another to enlarge the opening.

3. The clamping assembly according to claim 2, wherein the collet includes an inner diameter, and an insert is secured to each of the fingers at the inner diameter.

4. The clamping assembly according to claim 3, wherein the insert is constructed from a material that is different than the material of the collet.

5. The clamping assembly according to claim 1, wherein a hole extends through the adjacent fingers with a coil spring arranged within the hole, wherein a set screw is arranged in the hole retaining the coil spring within the hole.

6. A clamping assembly for a cutter assembly comprising:
a stationary tapered collar extending radially inward towards an axis;
a clamping sleeve movable along the axis relative to the tapered collar, the clamping sleeve including flexible arms that flex inwardly upon contact with the stationary tapered collar;
an actuator coupled to the clamping sleeve and configured to move the clamping sleeve along the axis between extended and retracted positions;
a collet in contact with said clamping sleeve, the collet including circumferentially arranged axially extending fingers, the clamping sleeve forcing the fingers radially inward with the clamping sleeve in the extended position by contact with said tapered collar, and a member biasing the fingers radially outward with the clamping sleeve in the retracted position wherein the collet includes an axially extending opening provided by the fingers and configured to receive material, a pivot comprised of a circumferential slot extending radially inwardly at an axially innermost part of the fingers, the fingers including faces adjacent to adjoining finger faces, and the biasing member arranged between the fingers and configured to bias the fingers away from one another to enlarge the opening.

7. The clamping assembly according to claim 6, comprising an insert affixed to each of the fingers and that is constructed from a material that is different than the material of the collet.

8. The clamping assembly according to claim 7 wherein said collet is made of high viscosity acetal homopolymer and said inserts are made of nylon having molybdenum disulfide.

9. The clamping assembly according to claim 1, wherein said clamping sleeve extends axially rearward of said collet.

10. The clamping assembly according to claim 1, wherein said clamping sleeve includes a hollow passage configured to receive tubing.

11. The clamping assembly according to claim 1, wherein said tapered collar is part of a spindle.

12. The clamping assembly according to claim 11, wherein said collet includes threaded ears that secure said collet to said spindle.

13. The clamping assembly according to claim 12, wherein said threaded ears are circumferentially spaced from one another and are positioned axially rearward from said tapered collar.

14. The clamping assembly according to claim 12, wherein said flexible arms of said clamping sleeve are received between said threaded ears in arcuate openings.

15. The clamping assembly according to claim 1, wherein said collet includes a tapered surface at a rearmost portion of said collet.

16. The clamping assembly according to claim 3, wherein said inserts are secured to said fingers by fasteners secured within holes.

* * * * *